US 6,193,481 B1

(12) United States Patent
Alaze et al.

(10) Patent No.: US 6,193,481 B1
(45) Date of Patent: Feb. 27, 2001

(54) PISTON PUMP

(75) Inventors: Norbert Alaze, Markgroeningen; Friedrich Megerle, Asperg; Ernst-Dieter Schaefer, Brackenheim; Wolfgang Schuller, Sachsenheim; Guenther Schnalzger, Blaichach; Ralf Zitzelsberger, Marktoberdorf; Gerd Baur, Rettenberg-Freidorf; Michael Hellebrandt, Burgberg, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/230,165

(22) PCT Filed: Mar. 7, 1998

(86) PCT No.: PCT/DE98/00686
§ 371 Date: Sep. 13, 1999
§ 102(e) Date: Sep. 13, 1999

(87) PCT Pub. No.: WO98/53209
PCT Pub. Date: Nov. 26, 1998

(30) Foreign Application Priority Data

May 21, 1997 (DE) ............................... 197 21 227

(51) Int. Cl.$^7$ .................................................. F04B 39/10
(52) U.S. Cl. .............................. 417/549; 92/171
(58) Field of Search .................... 417/549, 470; 92/171.1

(56) References Cited

U.S. PATENT DOCUMENTS

| 1,592,266 | * | 7/1926 | Hamer | 62/171.1 |
| 3,848,325 | * | 11/1974 | Bimba | 29/511 |
| 4,184,411 | * | 1/1980 | Morris et al. | 92/171.1 |
| 5,235,899 | * | 8/1993 | Hauser | 92/110 |
| 5,375,507 | * | 12/1994 | Kladiwa et al. | 92/128 |
| 5,511,463 | * | 4/1996 | Stockton | 92/171.1 |
| 5,722,312 | * | 3/1998 | Kristensen | 92/171.1 |
| 6,000,764 | * | 12/1999 | Dokas | 303/116.4 |
| 6,044,752 | * | 4/2000 | Harigaya | 92/163 |

FOREIGN PATENT DOCUMENTS

96/28661 * 3/1993 (WO).

* cited by examiner

Primary Examiner—Charles G. Freay
Assistant Examiner—Robert Z. Evora
(74) Attorney, Agent, or Firm—Ronald E. Greigg; Edwin E. Greigg

(57) ABSTRACT

A piston pump, which is provided as a return feed pump for a slip-regulated motor vehicle brake system. In order to simplify the manufacture, a sleeve in the form of a tubular piece is clamped between a fastening element which is inserted into the cylinder bore using a self-clinching technique, and the cylinder bore, and is thus sealed and fixed in place. In addition to the simple manufacture of the sleeve out of reasonably priced tubular material, the piston pump has the advantage of a sealing of the sleeve in the cylinder bore without a separate sealing element such as a sealing ring.

9 Claims, 4 Drawing Sheets

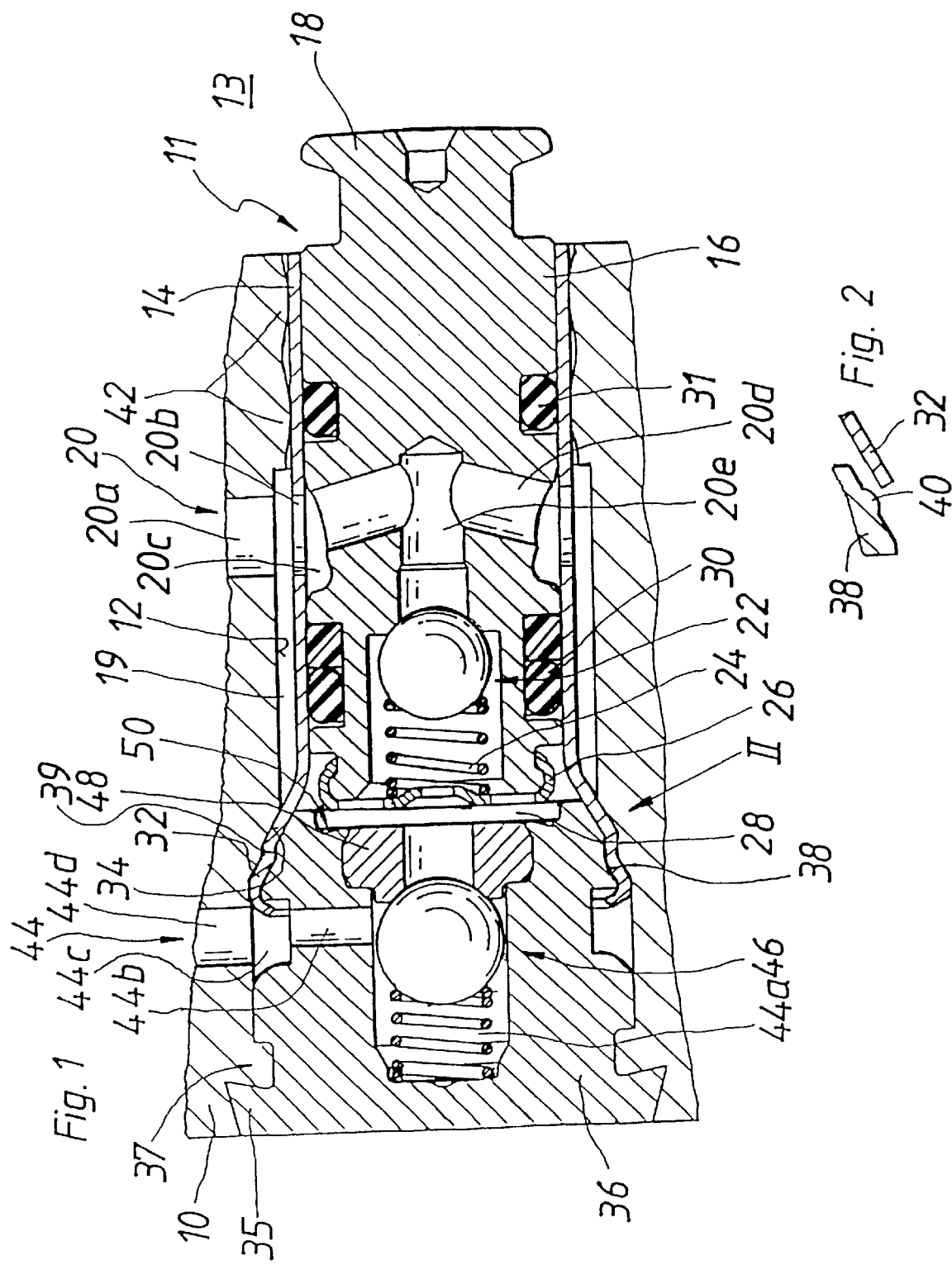

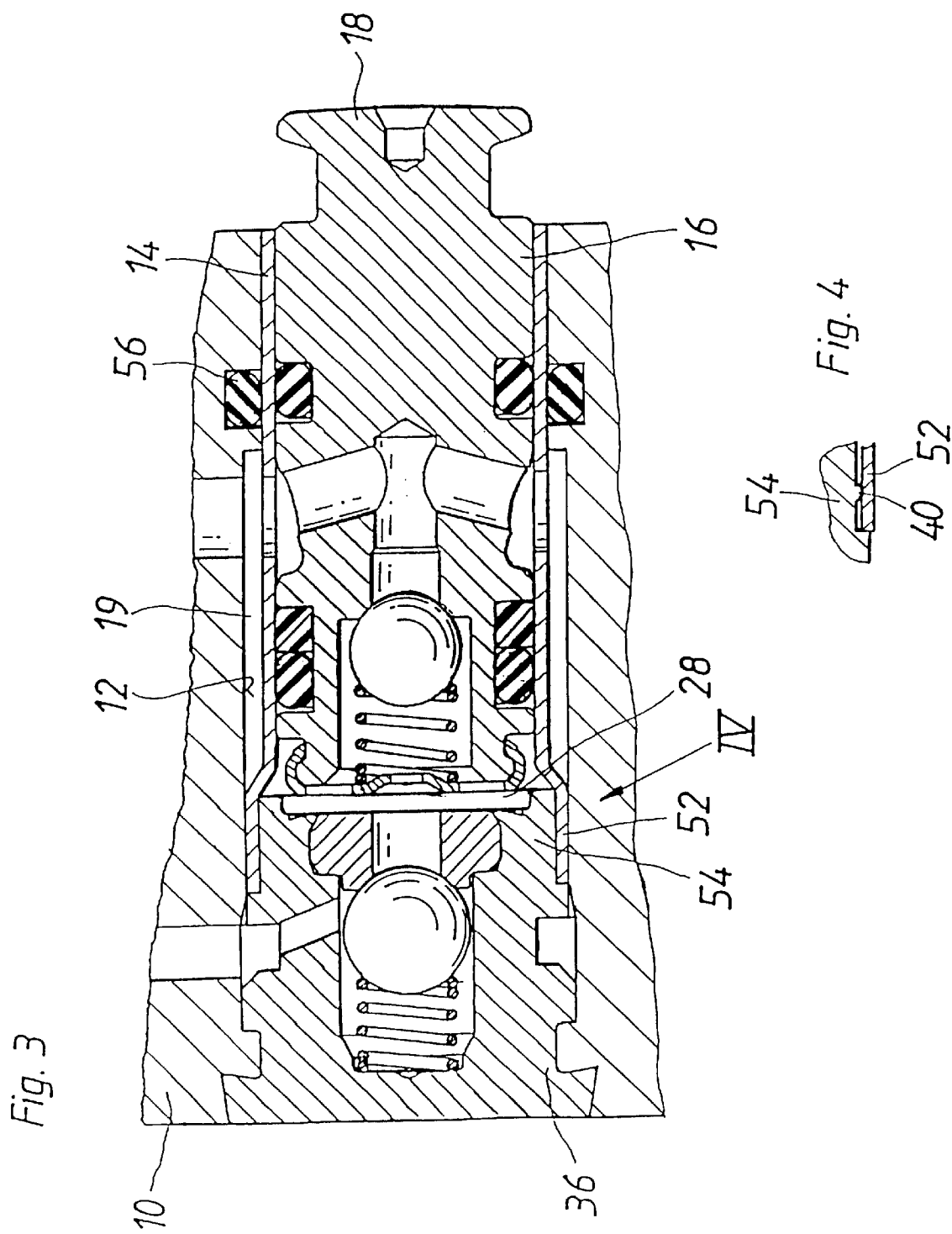

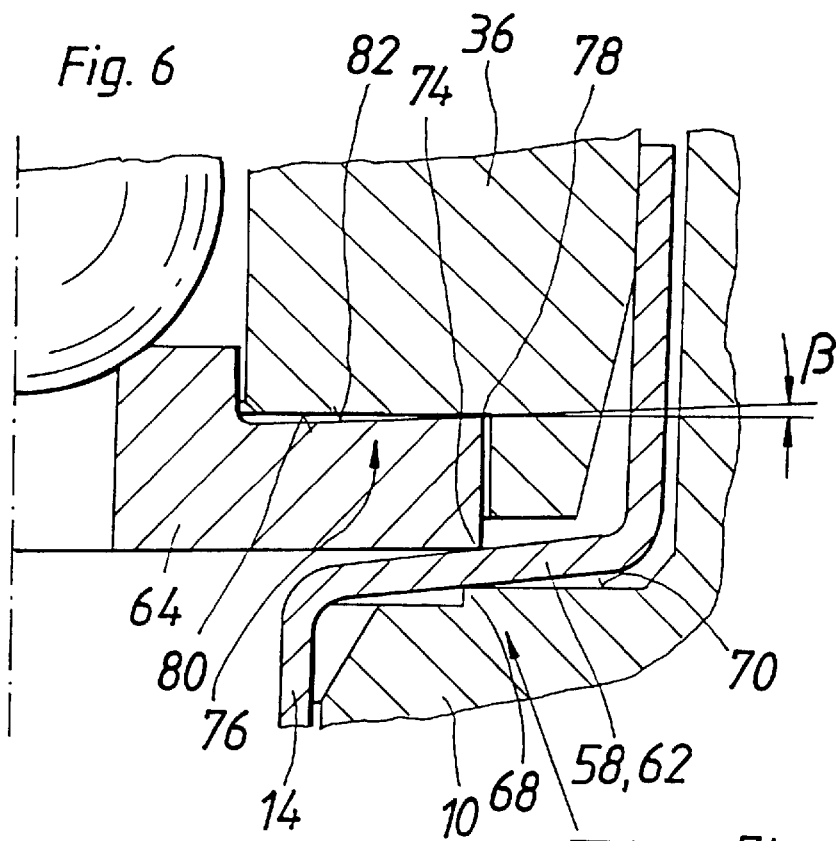
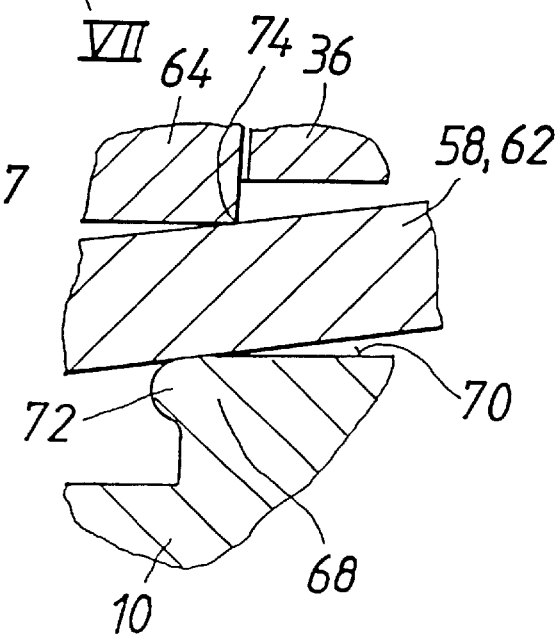

PISTON PUMP

CROSS-REFERENCES TO RELATED APPLICATIONS

This is a 371 application of PCT/DE98/00686 filed on Mar. 7, 1998.

BACKGROUND OF THE INVENTION

The invention relates to a piston pump, which is particularly provided for use as a pump for a motor vehicle brake system with an antilock device, a drive slip device, a device for regulating vehicle movement dynamics, and/or for a power brake system of a motor vehicle.

Many piston pumps of this kind have been disclosed. The piston pumps known from DE 40 27 794 A1 and DE 44 07 978 A1 are mentioned by way of example. The known piston pumps have a pump housing into which a sleeve is inserted in a stationary fashion, which receives a piston that can move axially. This sleeve of the known pump pistons has a blind bore in the form of a stepped bore for receiving the piston and an outlet valve. An outside of the sleeve is provided with a number of grooves, undercuts, and steps, for example for the insertion of sealing rings or for use as stop faces. The sleeve is a turned part, whose manufacture is costly because of its inner and outer shape. Another disadvantage is that after the machining work, the sleeve has to be hardened in order to keep its wear low in the operation of the piston pump and in order to thus achieve a sufficient service life.

ADVANTAGES OF THE INVENTION

The piston pump according to the invention, has a tubular piece as the sleeve. This can be manufactured in the shortest time possible without machining work, for example by means of separation from a tube.

This results in considerable time, material, and cost savings. The sleeve is preferably thin-walled, i.e. contains a small amount of material. It can therefore also be manufactured out of expensive, wear-resistant material without significantly increasing the costs of the piston pump according to the invention.

BRIEF DESCRIPTION OF THE DRAWINGS

The invention will be explained in more detail below in conjunction with exemplary embodiments depicted in the drawings.

FIG. 1 is an axial section of a piston pump according to the invention,

FIG. 2 is a detail depiction of a modified embodiment of the invention according to arrow II in FIG. 1, FIG. 3 is an axial section of a second embodiment of the invention, FIG. 4 is a detail depiction according to arrow IV in FIG. 3, FIG. 6 is an enlarged-scale detail depiction according to arrow VI in FIG. 5, and FIG. 7 is an enlarged-scale detail depiction according to arrow VII in FIG. 6.

DESCRIPTION OF THE FIRST EXEMPLARY EMBODIMENT

Figure 5:
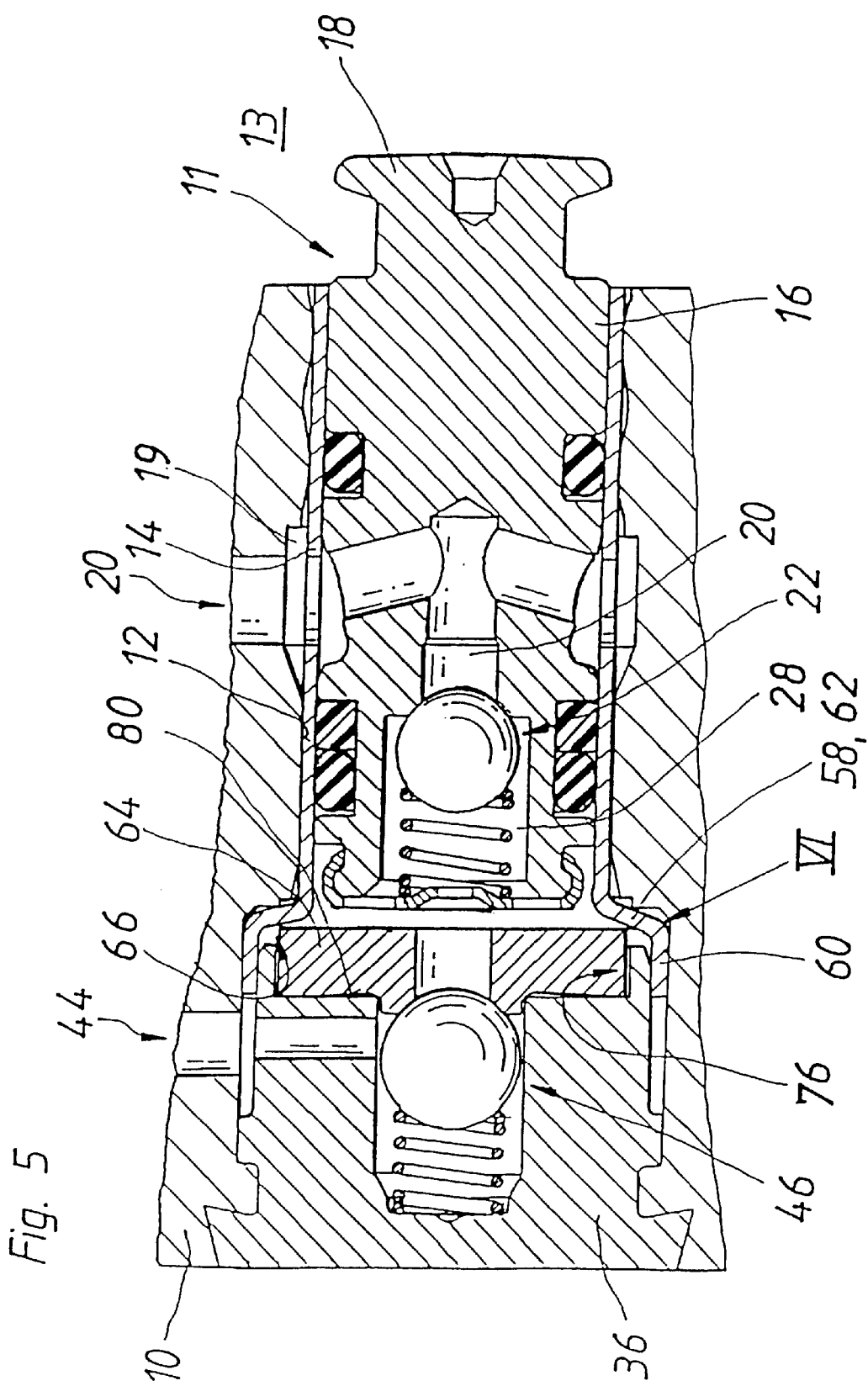
FIG. 5 is an axial section of a third embodiment of the invention.

The piston pump according to the invention represented in FIG. 1 is in particular provided as a return feed pump in a brake system of a vehicle with a wheel slip regulation. With the wheel slip regulation, for example a locking of the wheels of the vehicle can be prevented during a braking procedure and/or a spinning of the driven wheels of the vehicle can be prevented during an intense acceleration.

As a pump housing 10, the piston pump according to the invention has a hydraulic block into which, in addition to the piston pump as a return feed pump for a slip-regulated motor vehicle brake system, other hydraulic components for the slip regulation, not shown, are inserted and are hydraulically connected to one another and to the piston pump. Only a fraction of the hydraulic block that constitutes the pump housing 10 is shown in the drawing, the section which shows the essential parts of the piston pump according to the invention. The piston pump includes one or more, preferably two, pump elements 11 that are contained in the pump housing 10. For the sake of visibility, only one pump element 11 is depicted. The pump housing 10 encloses an inner chamber 13 in which a cam drive, not shown, is provided.

A tubular piece, which functions as a sleeve 14 that contains an axially movable piston 16, is inserted into a cylinder bore 12 of the pump housing 10, which bore is embodied as stepped and extends from an outer side of the pump housing 10 into the inner chamber 13. A head 18 of the piston 16, which is provided for driving the piston 16 into a reciprocating stroke motion in a known manner by means of the cam drive, not shown, protrudes from one end into the inner chamber 13 of the pump housing 10. In a region between the two ends of the sleeve 14, an inner diameter of the cylinder bore 12 is greater than an outer diameter of the sleeve 14 so that a radial distance 19 remains free in this region between the sleeve 14 and the pump housing 10.

The piston pump has a pump inlet 20. The pump inlet 20 essentially includes an inlet conduit 20a let into the pump housing 10, the radial space 19, a lateral bore 20b leading through the wall of the sleeve 14, a recess 20c provided on the outer circumference of the piston 16, and at least one lateral bore 20d connecting the recess 20c to an axial stepped bore 20e let into the piston 16. A spring-loaded ball check valve is inserted as an inlet valve 22 into the axial stepped bore 20e of the piston 16, which bore belongs to the pump inlet 20, and the valve closing spring 24 of this inlet valve is supported against a sheet metal cap 26 that is placed on an end face of the piston 16 oriented toward a displacement chamber 28 and is secured by means of crimping.

In contrast to the exemplary embodiment shown, the inlet valve 22 can also be provided in the inlet conduit 20a of the pump housing 10 instead of in the piston 16. A guidance gap between the movable piston 16 and the sleeve 14 is sealed with two O-rings as sealing rings 30, 31. One of the two sealing rings 30 separates the pump inlet 20 from the displacement chamber 28 and the other sealing ring 31 separates the pump inlet 20 from the inner chamber 13 of the pump housing 10.

An end of the sleeve 14 that encompasses the displacement chamber 28 has a conical widening 32, which rests against a complementary widening 34 of the cylinder bore 12. The sleeve 14 with its conical widening is manufactured as a deep-drawn part, in a fashion similar to a cup or the like. It can be hardened after the deep drawing.

To close the cylinder bore 12 on the end of the displacement chamber 28, a stopper is inserted into the cylinder bore 12 in a fixed manner using the so-called self-clinching technique. Self-clinching means a caulking produced by pressing in the stopper: the stopper has a continuous radial flange 35 that protrudes outward and has a sharp-edged cross section on its outer side remote from the piston 16. This radial flange 35 of the stopper, which is manufactured out of steel by turning, plastically deforms the pump housing 10, which is comprised of a softer material, for example cast aluminum, into a continuous annular groove 37 of the stopper, which groove directly adjoins the radial flange 35 on an end oriented toward the piston 16 when the stopper is pressed axially against the pump housing with a sufficient degree of force. The plastic deformation of the material of the pump housing 10 into the annular groove 37 of the stopper produces a reliable seal and a large holding force between the stopper and the pump housing 10.

The stopper constitutes a fastening element 36 for the sleeve 14. It has a cone 38 that is complementary to the widening 32 of the sleeve 14 and which lies inside the widening 32 and presses it outward against the widening 34 of the cylinder bore 12. As a result, the sleeve 14 is fixed in the pump housing 10 and on its end that encloses the displacement chamber 28, is sealed both in relation to the pump housing 10 and in relation to the fastening element 36. For a reliable seal, the cone 38 of the fastening element 36 has an axial annular step 39 and the widening 34 of the cylinder bore 12 has a complementary opposing step into which the annular step 39 of the fastening element elastically/plastically deforms the widening 32 of the sleeve 14.

Another possibility for a reliable seal is to provide the cone 38 of the fastening element 36 with a continuous sealing bead 40, as depicted in FIG. 2, which is elastically and/or plastically deformed upon insertion of the fastening element 36 into the cylinder bore 12 by means of pressing against the widening 32 of the cylinder sleeve 14. The materials of the sleeve 14 and the fastening element 36 have approximately the same hardness.

The piston pump has a pump outlet 44. The pump outlet 44 essentially includes a blind bore 44a coaxially let into the fastening element 36, a continuous recess 44c provided on the outer circumference of the fastening element 36, at least one lateral bore 44b connecting the blind bore 44a to the recess 44c, and an outlet conduit 44d that is provided in the pump housing 10 and leads from the recess 44c to a high-pressure connection, not shown.

On the end of the head 18 of the piston 16, the pump housing 10 has one or more, preferably two, continuous, flat, and wide sealing wave surfaces 42, which protrude into the cylinder bore 12. The sleeve 14 is inserted in a sealed fashion into these sealing wave surfaces 42 by means of a press fit. The press fit between the radially inward-pointing wave crests of the sealing wave surfaces 42 and the outer circumference of the sleeve 14 prevents an impermissible leakage connection for the fluid supplied by the piston pump, between the pump inlet 20 and the inner chamber 13.

In the central region of the sleeve 14, between its conical widening 32 and the sealing wave surfaces 42 of the pump housing 10, the cylinder bore 12 has a play fit in relation to the sleeve 14, i.e. in the central region of the sleeve 14, the radial distance 19 is present between the sleeve 14 and the pump housing 10 so that the sleeve 14 can be inserted into the cylinder bore 12 with a low degree of force, which in particular prevents damage to the sleeve 14 upon insertion. Since the pressing between the wave crests of the sealing waves 42 and the outer circumference of the sleeve 14 is only very short in terms of the longitudinal direction of the pump element 11, the insertion of the sleeve 14 into the pump housing 10 is hindered only in an insignificant manner by the pressing in the region of the sealing wave surfaces 42. A reliable seal is nevertheless achieved between the two ends of the sleeve 14 and the pump housing 10 against whose sealing wave surfaces 42 the sleeve 14 rests with its one end and against whose widening 34 it rests with the widening 32 on its other end. In the piston pump embodied according to the invention with the pump element 11 in the pump housing 10, the pump inlet 20 is sealed inexpensively in relation to the inner chamber 13 on the one end and in relation to the pump outlet 44 on the other end.

Sealing rings inserted between the sleeve 14 and the pump housing 10 in order to seal the sleeve 14 in relation to the pump housing 10 are not necessary. This has the advantage of a reduction of the individual parts of the piston pump according to the invention, the number of work cycles required for assembling the piston pump is reduced, and the sleeve 14 is more rigidly received in the pump housing 10. Furthermore, a required installation space of the piston pump according to the invention is reduced by means of the sleeve 14 that has thin walls in comparison to known sleeves.

The fastening element 36 has the coaxial blind bore 44a which adjoins the displacement chamber 28. A spring-loaded ball check valve is inserted as an outlet valve 46 into this blind bore 44a. An annular valve seat body 48 of the outlet valve 46 is inserted into a mouth of the blind bore 44 and is fastened by means of caulking (reference numeral 50).

If the piston 16 is driven into axially reciprocating stroke motions by means of the cam drive provided in the inner chamber 13 of the pump housing 10, then the pump element 11 supplies a fluid, for example brake fluid, from the pump inlet 20, through the inlet valve 22, into the displacement chamber 28, and from there, through the outlet valve 46 into the pump outlet 44.

DESCRIPTION OF THE SECTION EXEMPLARY EMBODIMENT

The sleeve 14 of the piston pump according to the invention shown in FIG. 3 has a cylindrical widening 52 on its end encompassing the displacement chamber 28, and the fastening element 36, with a cylindrical section 54 formed onto it, engages in this end. The diameter of the cylindrical section 54, the wall thickness of the sleeve 14, and a diameter of the cylinder bore 12 are matched to one another so that a press fit is produced between the cylindrical section 54 and the cylindrical widening 52 as well as between the cylindrical widening 52 and the cylinder bore 12 of the pump housing 10, i.e. the cylindrical section 54 of the fastening element 36 presses the sleeve 14 at its cylindrical widening 52 against a wall of the cylinder bore 12.

For the assembly, first, the sleeve 14 is pressed onto the fastening element 36, wherein the cylindrical widening 52 of the sleeve 14 is elastically expanded. The elastically expanded widening 52 of the sleeve 14 has an excess with regard to the cylinder bore 12 that produces the press fit. As a result, the sleeve 14 is fixed in the pump housing 10 and a seal is produced between the sleeve 14 and the pump housing 10 as well as between the sleeve 14 and the fastening element 36.

Before the insertion of the fastening element 36 into the cylinder bore 12, the cylindrical section 54 of the fastening element 36 has a continuous sealing bead 40 (FIG. 4), which is elastically and/or plastically deformed when the cylindrical section 54 is pressed into the widening 52 of the sleeve 14. Since the sleeve 14 is pressed onto the fastening element 36 outside the cylinder bore 12, the sealing bead 40 expands the sleeve 14 and is respectively pressed down by the sleeve 14, while the sleeve 14, together with the fastening element 36, is introduced into the cylinder bore 12 so that it is not shorn off.

In the simplest instance, a tubular piece with a hollow cylindrical cross section, i.e. without a widening, can be used as a sleeve 14, which, together with the fastening element 36, is sealed (not shown) and fixed in the axial direction in the pump housing 10 in the same fashion as described above and shown in FIG. 3.

On the end of the head 18 of the piston 16 a seal between the sleeve 14 and the pump housing 10 of the piston pump shown in FIG. 3 is produced with an O-ring 56 as a sealing ring, which is inserted into a groove let into the cylinder bore 12 of the pump housing 10. The seal can also be produced with a sealing mass or with adhesive.

The piston pump shown in FIG. 3 is otherwise constructed correspondingly to the piston pump shown in FIG. 1 and functions in the same manner. The same reference numerals are used for equivalent components. In order to avoid repetition, the corresponding embodiments will be referred to FIG. 1.

DESCRIPTION OF THE THIRD EXEMPLARY EMBODIMENT

On its end encompassing the displacement chamber 28, the sleeve 14 of the piston pump according to the invention depicted in FIG. 5 transitions with an annular step 58 into a cylindrical widening 60. An annular disk face 62, with which the sleeve 14 transitions on its annular step 58 into the widening 60, extends at a sharp angle to an imaginary radial surface and forms a flat, obtuse-angled cone.

By way of a valve seat part 64, the fastening element 36, which is inserted into the end of the cylinder bore 12 remote from the piston 16 using the self-clinching technique, presses the sleeve 14 on its annular step 58 in the axial direction against a complementary annular step 66 of the cylinder bore 12 and thus fixes the sleeve 14 in the axial direction. A sealing of the sleeve 14 in relation to the pump housing 10 is produced at a continuous sealing step 68, which is embodied at a radial annular disk face 70 that constitutes a bottom of the annular step 66 of the cylinder bore 12 (FIG. 6). As a result of the sleeve 14 pressing axially with its annular step 58 against the continuous sealing edge 68 of the pump housing 10, the sealing edge 68 is elastically and/or plastically deformed forming a bead 72 that is directed radially inward, as shown in FIG. 7, by means of which a reliable seal is produced between the sleeve 14 and the pump housing 10.

The seal between the valve seat part 64 and the sleeve 14 is produced at a continuous outer edge 74 of the valve seat part 64, with which the valve seat part 64 rests against an inside of the annular step 58 of the sleeve 14.

The valve seat part 64 rests in a cylindrical recess 76 in an end face of the fastening element 36 oriented toward the piston 16. Since the fastening element 36 presses the valve seat part 64 in the axial direction against the annular step 58 of the sleeve 14, the valve seat part 64 is fixed in the recess 76 of the fastening element 36 without requiring a caulk (see reference numeral 50 in FIG. 1) or another measure for fastening.

A seal between the valve seat part 64 and the fastening element 36 is produced at a continuous outer edge 78 of the valve seat part 64, with which this valve seat part 64 rests against a bottom 80 of the recess 76 (FIG. 6). In order to embody this outer edge 78 as a sealing edge, the bottom face 80 of the recess 76 of the fastening element 36 and/or an end face 82 of the valve seat part 64 oriented toward the bottom face 80 deviates from an imaginary radial face by a sharp angle S.

The piston pump according to the invention shown in FIG. 5 is otherwise constructed correspondingly to the piston pump shown in FIG. 1 and functions in the same manner. Consequently, the corresponding embodiments will be referred to FIG. 1.

The foregoing relates to a preferred exemplary embodiment of the invention, it being understood that other variants and embodiments thereof are possible within the spirit and scope of the invention, the latter being defined by the appended claims.

What is claimed is:

1. A piston pump for a motor vehicle brake system, comprising a piston (16) that is driven into a reciprocating stroke motion, said piston is contained so that the piston moves axially in a sleeve wherein the sleeve is inserted into a cylinder bore (12) of a pump housing, the sleeve (14) is a tubular piece with essentially constant wall thickness, a pump inlet 20, an inlet control valve 22 in said piston (16) that controls fuel flow in said pump inlet, a pump outlet (44), an outlet valve (46) that controls flow from the inlet valve to said pump outlet, a compression chamber (28) between the inlet valve (22) and the outlet valve (46) whereby the compression chamber (28) is increased and decreased in size in alternation by a reciprocating stroke motion of the driven pump 16.

2. The piston pump according to claim 1, in which the sleeve (14) is thin-walled.

3. The piston pump according to claim 1, in which in a region of at least one of its ends, the sleeve (14) rests in a sealed fashion against the cylinder bore (12) and, in a central region, the sleeve has play in the pump housing (10).

4. The piston pump according to claim 1, in which a fastening element (36) that is inserted into the cylinder bore (12) presses the sleeve (14) at one end disposed in a region of a displacement chamber (28) of the piston pump against a wall of the cylinder bore (12) in a sealed fashion and in a way that fixes the sleeve (14) in an axial direction.

5. The piston pump according to claim 4, in which the sleeve (14) has a widening (32; 52; 60) on an end disposed in the region of the displacement chamber (28) of the piston pump and, by means of the fastening element (36) that is inserted into the cylinder bore (12), this widening is pressed against a complementary widening (34; 66) of the cylinder bore (12) in a sealed fashion and in a way that fixes the sleeve (14) in the axial direction.

6. The piston pump according to claim 5, in which the sleeve (14) has an annular step (58) as a widening, which rests in a complementary annular step (66) as a widening of the cylinder bore (12), and by means of the fastening element (36) that is inserted into the cylinder bore (12), is pressed in the axial direction against a continuous sealing edge (68) that is embodied at a radial annular disk face (70) of the annular step (66) of the cylinder bore (12).

7. The piston pump according to claim 6, in which the piston pump has a check valve (46) that is disposed opposite from the piston (16) in the displacement chamber (28) and has a valve seat part (64) which rests in between the fastening element (36) inserted into the cylinder bore (12) and the annular step (58) of the sleeve (14) and is pressed in the axial direction against this annular step (58) by the fastening element (36).

8. The piston pump according to claim 7, in which the valve seat part (64) has a first continuous sealing edge (74), with which the valve seat part rests against the annular step (58) of the sleeve (14).

9. The piston pump according to claim 7, in which the valve seat part (64) has a second continuous sealing edge (78) with which the valve seat part rests against the fastening element (36).

* * * * *